(12) United States Patent
Nakano et al.

(10) Patent No.: US 11,306,819 B2
(45) Date of Patent: Apr. 19, 2022

(54) GASKET-MOUNTING STRUCTURE

(71) Applicant: NIPPON PILLAR PACKING CO., LTD., Osaka (JP)

(72) Inventors: Atsushi Nakano, Osaka (JP);
Tomohiro Adachi, Osaka (JP);
Tomoyuki Koike, Osaka (JP);
Kazukiyo Teshima, Osaka (JP);
Motoaki Naruo, Osaka (JP)

(73) Assignee: NIPPON PILLAR PACKING CO., LTD., Osaka (JP)

( * ) Notice: Subject to any disclaimer, the term of this patent is extended or adjusted under 35 U.S.C. 154(b) by 118 days.

(21) Appl. No.: 16/424,590

(22) Filed: May 29, 2019

(65) Prior Publication Data
US 2019/0390772 A1    Dec. 26, 2019

(30) Foreign Application Priority Data

Jun. 21, 2018 (JP) .............................. JP2018-118027

(51) Int. Cl.
*F16J 15/02* (2006.01)
*F16L 23/22* (2006.01)

(52) U.S. Cl.
CPC ............. *F16J 15/025* (2013.01); *F16L 23/22* (2013.01)

(58) Field of Classification Search
CPC .......... F16J 15/02; F16J 15/021; F16J 15/022; F16J 15/025; F16J 15/08; F16L 23/00; F16L 23/22; F16L 23/18; F16L 13/00; F16L 17/00; F16L 19/00

USPC ......................................................... 277/612
See application file for complete search history.

(56) References Cited

U.S. PATENT DOCUMENTS

| 3,180,664 | A | * | 4/1965 | Franck | ..................... | F16L 27/04 |
|   |   |   |   |   |   | 285/266 |
| 3,239,245 | A | * | 3/1966 | Press | ....................... | F16L 17/08 |
|   |   |   |   |   |   | 285/18 |
| 5,806,833 | A | * | 9/1998 | Riibe | ..................... | F16L 27/053 |
|   |   |   |   |   |   | 251/305 |
| 6,045,165 | A | * | 4/2000 | Sugino | .................. | E21B 17/042 |
|   |   |   |   |   |   | 285/333 |

FOREIGN PATENT DOCUMENTS

JP    2006-153180    6/2006

\* cited by examiner

*Primary Examiner* — Nathan Cumar
(74) *Attorney, Agent, or Firm* — Oblon, McClelland, Maier & Neustadt, L.L.P.

(57) ABSTRACT

A gasket includes a first slope at a first axial end. The fluid device includes a second slope that contacts the first slope. The first slope and the second slope have different gradients. The first slope allows at least the first axial end to be deformed along the second slope. The first slope contacts the second slope with a gradient that varies depending on a gradient of the second slope to seal a gap between the first slope and the second slope.

4 Claims, 8 Drawing Sheets

GASKET-MOUNTING STRUCTURE

TECHNICAL FIELD

The invention relates to gasket-mounting structures.

BACKGROUND ART

A gasket-mounting structure is known, which is disclosed in JP 2006-153180 A, for example. The structure allows a gasket to be mounted on a first flange pipe and to seal the gap between the gasket and the flange pipe. While the first flange pipe has a reverse-tapered face at the inner periphery of the tip of its first connection end, the gasket has a tapered face at the outer periphery of the tip of its second connection end. The reverse-tapered face contacts the tapered face. The gasket-mounting structure allows the reverse-tapered face of the first flange pipe and the tapered face of the gasket to be tightly pressed against each other when the gasket is being mounted on the first flange pipe. Thus, a sealing area is provided between the reverse-tapered face and the tapered face.

SUMMARY OF THE INVENTION

In each conventional gasket-mounting structure, the reverse-tapered face of a fluid device and the tapered face of a gasket are planes parallel to each other; the profiles in their vertical cross sections are parallel lines. The parallel planes are pressed against each other to form a sealing area. Accordingly, the gasket-mounting structure needs an external force properly exerted on the gasket, which results in pressure that the entirety of the reverse-tapered face of the fluid device receives from the entirety of the tapered face of the gasket. Surely forming the sealing area requires carefully mounting the gasket on the fluid device to allow the reverse-tapered face of the fluid device and the tapered face of the gasket to be tightly pressed against each other.

To solve the above-described problems, the invention is provided. An object of the invention is to easily and stably seal the gap between a gasket and a fluid device.

According to an aspect of the invention, a structure allows a gasket to be mounted on a fluid device. The gasket includes a first slope at a first axial end. The fluid device includes a second slope that contacts the first slope. The first slope and the second slope have different gradients. The first slope allows at least the first axial end to be deformed along the second slope. The first slope contacts the second slope with a gradient that varies depending on a gradient of the second slope to seal a gap between the first slope and the second slope.

DESCRIPTION OF THE EMBODIMENTS

Figure 1:
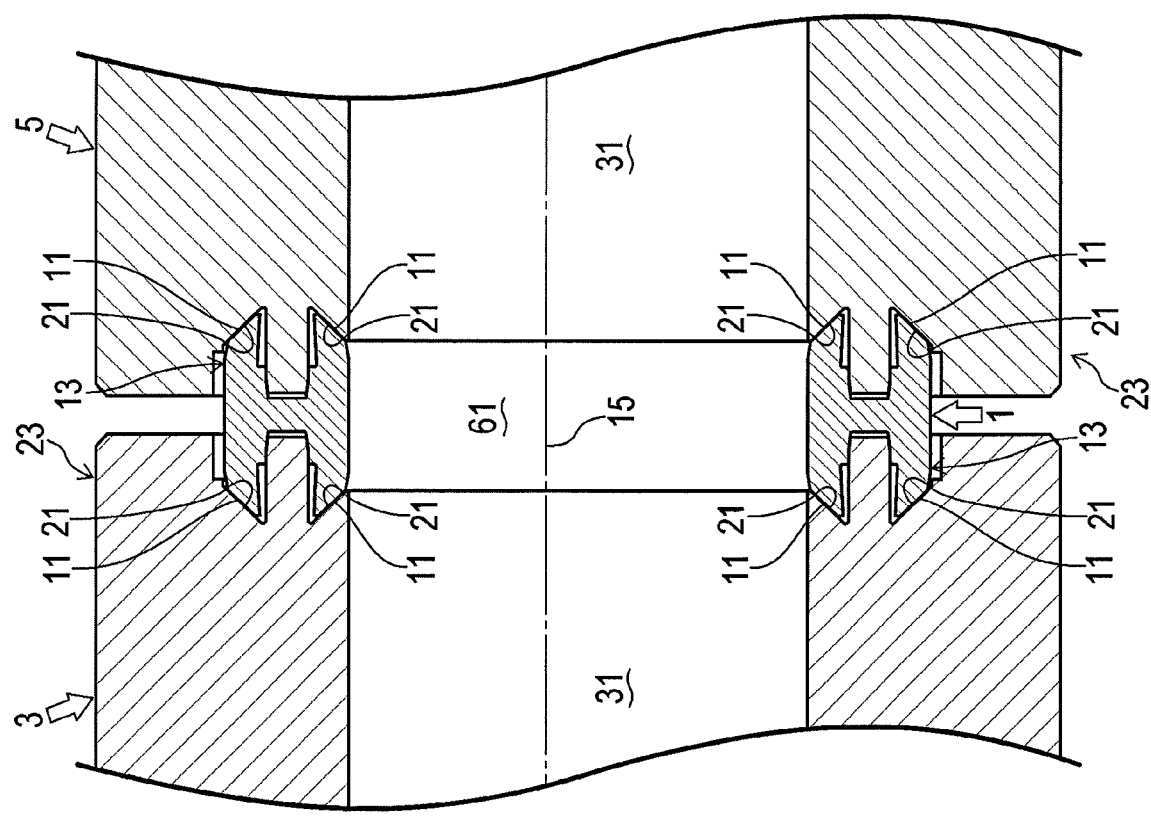
FIG. 1 is a cross-section view of a gasket-mounting structure according to an embodiment of the invention.

As shown in FIGS. 1-4, a gasket-mounting structure according to an embodiment of the invention is used to mount a gasket 1 on a first fluid device 3. The structure is also used to mount the gasket 1 on a second fluid device 5. The structure connects the first fluid device 3 to the second fluid device 5. One of the fluid devices 3 and 5 is located at an upper portion of the flow of fluid, and the other is at a lower portion of the flow. The gasket 1 is placed between the fluid devices 3 and 5.

Note that the fluid devices 3 and 5 on which the gasket 1 is mounted are devices relating to fluid that include, but are not limited to, integrated panels, valves, pumps, accumulators, fluid reservoirs, heat exchangers, regulators, pressure gauges, flowmeters, heaters, and flange pipes.

The gasket 1 is a ring with a constant inner diameter. The gasket 1 includes an annular attaching portion 13 at a first axial end. The attaching portion 13 has a first ring (i.e. an inner protrusion 63 described later). The first ring has a first slope 11 at the first axial end. The gasket 1 also includes another attaching portion 13 at a second axial end.

Figure 3:
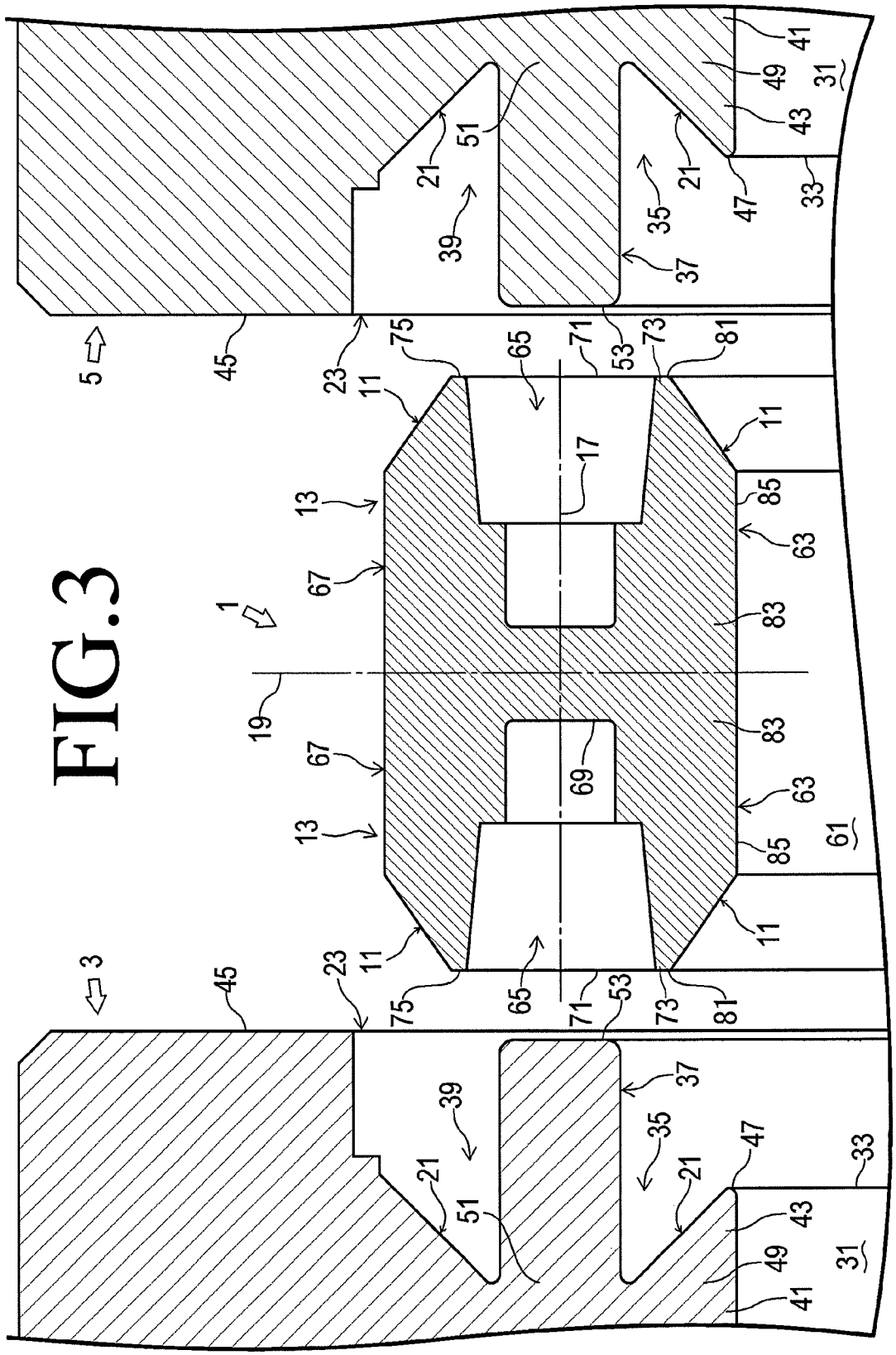
FIG. 3 is an exploded view of the gasket-mounting structure of FIG. 2.

A cross section of the gasket 1 that includes the axis 15 of the gasket 1 is symmetric with respect to the axis 15. The annular portion of the gasket 1 that defines the hole of the gasket 1 has an H-shaped cross section, on which the shapes of the attaching portions 13 are based. As shown in FIG. 3, the H-shaped cross section is symmetric with respect to a first virtual line 17 parallel to the axis 15 of the gasket 1 and passing through the radial center of the H-shaped cross section. The H-shaped cross section is also symmetric with respect to a second virtual line 19 perpendicular with the first virtual line 17. Note that the gasket 1 is not limited to the ring that includes the annular portion with the H-shaped cross section.

The first fluid device 3 includes an annular attached portion 23, which has a first sleeve (i.e. a protrusion 43 described later) with a second slope 21 that contacts the first slope 11. The second fluid device 5 also includes another annular attached portion 23, which has another first sleeve (i.e. another protrusion 43) with another second slope 21 that contacts another first slope 11. The attached portion 23 of the first fluid device 3 is located on a first axial side of the attached portion 23 of the second fluid device 5. The attached portions 23 are adjacent to each other and arranged coaxially to face each other across the gasket 1.

The structure allowing the first axial side (the left side in FIG. 1) of the gasket 1 to be mounted on the first fluid device 3 is equivalent to the structure allowing the second axial side (the right side in FIG. 1) of the gasket 1 to be mounted on the second fluid device 5. Thus, the following will mainly explain the structure at the first fluid device 3.

The attached portion 23 of the first fluid device 3 is placed at a second axial end of the first fluid device 3, its right end in FIG. 1. The attached portion 23 encloses a first fluid channel 31, which has a circular cross section and extends along the axis of the gasket 1 mounted on the first fluid device 3, i.e. in a horizontal direction in FIG. 1. The first fluid channel 31 is a hole, i.e. an inner space, of the annular attached portion 23. The first fluid channel 31 is open towards the gasket 1, rightward in FIG. 1. The opening 33 of the first fluid channel 31 is placed inside the (right) end face 45 of the attached portion 23.

The attached portion 23 is made from certain thermoplastic resin, which includes, for example, fluoropolymer such as perfluoroalkoxy alkane (PFA) and polytetrafluoroethylene (PTFE). Alternatively, the fluoropolymer may be polychlorotrifluoroethylene (PCTFE) or ethylene-tetrafluoroethylene copolymer (ETFE). As usage, the attached portion 23 may be made from polypropylene (PP), high-density polyethylene (HDPE), low-density polyethylene (LDPE), or polyoxymethylene (POM).

The attached portion 23 includes an annular inner concave 35, an annular convex 37, and an annular outer concave 39 to contact the attaching portion 13 of the gasket 1 when the gasket 1 is mounted on the first fluid device 3. The opening 33 of the first fluid channel 31 is surrounded by the inner concave 35, which is surrounded by the convex 37, which is surrounded by the outer concave 39. The inner concave 35, the convex 37, and the outer concave 39 extend in the axial direction (a horizontal direction in FIG. 2), along which the gasket 1 approaches the first fluid device 3 when the gasket 1 is being mounted on the first fluid device 3. The inner concave 35, the convex 37, and the outer concave 39 are coaxial with each other and the first fluid channel 31.

The inner concave 35 has a shape that fits an inner protrusion 63 of the gasket 1, which will be described later. The inner concave 35 is open toward the gasket 1 (rightward in FIG. 2) and extends around the opening 33 of the first fluid channel 31 in a circumferential direction of the attached portion 23.

The convex 37 has a shape that fits a groove 65 of the gasket 1, which will be described later. The convex 37 protrudes from the body 41 of the first fluid device 3 toward the gasket 1 (rightward in FIG. 2) and extends around the inner concave 35 in a circumferential direction of the attached portion 23.

The outer concave 39 has a shape that fits a second ring 67 of the gasket 1, which is an outer protrusion described later. The outer concave 39 is open toward the gasket 1 (rightward in FIG. 2) and extends around the convex 37 in a circumferential direction of the attached portion 23.

A protrusion 43, together with the convex 37, forms the inner concave 35. In a radial direction of the attached portion 23, the protrusion 43 is located between the opening 33 of the first fluid channel 31 and the convex 37. The protrusion 43 extends from the body 41 of the first fluid device 3 toward the gasket 1 (rightward in FIG. 2). The protrusion 43 extends not only in an axial direction of the attached portion 23 but also in a circumferential direction of it around the opening 33 of the first fluid device 31. The protrusion 43 has an annular shape with a constant inner diameter and tapers toward an (right) end face 45 of the attached portion 23. The shape of the protrusion 43 reduces a cross-section area of the inner concave 35 with increase in distance from the opening of the inner concave 35. The protrusion 43 has an outer periphery with the annular second slope 21 and an inner periphery facing the first fluid channel 31.

The second slope 21 has a first portion near the tip end 47 (right end in FIG. 3) of the protrusion 43 and a second portion near the base (left) end 49 of it. The first portion is located at a distance from the convex 37 in a radial direction of the attached portion 23. The second portion is connected to the base end 51 of the convex 37.

The inner concave 35 and the outer concave 39 are symmetric with respect to the convex 37. Like the inner concave 35 defined by the convex 37 and the second slope 21, the outer concave 39 is defined by the convex 37 and another second slope 21.

The convex 37 is located on the left of the (right) end face 45 of the attached portion 23. To be exact, the tip end 53 of the convex 37 is located in an axial direction of the attached portion 23 nearer to the body 41 of the first fluid device 3 (leftward) than the end face 45 of the attached portion 23.

The (attaching portion 13 of the) gasket 1 is made from certain thermoplastic resin, which includes, for example, fluoropolymer such as PFA and PTFE. Alternatively, the fluoropolymer may be PCTFE or ETFE. As usage, the gasket 1 may be made from PP, HDPE, LDPE, or POM.

The gasket 1 includes a second fluid channel 61, which is a through hole in an axial direction of the annular body of the gasket 1. The second fluid channel 61 has a circular cross section perpendicular to the axial direction and extends in the axial direction (a horizontal direction in FIG. 1). The second fluid channel 61 has a constant diameter, which corresponds to the inner diameter of the gasket 1 and equals the diameter of the first fluid channel 31, which corresponds to the inner diameter of the attached portion 23. The second fluid channel 61 is coaxial with the first fluid channel 31. The second fluid channel 61 is open toward the first fluid device 3 (leftward in FIG. 1) at the first axial end (the left end in FIG. 1) of (the attaching portion 13 of) the gasket 1. Through the opening, the second fluid channel 61 is connected to the first fluid channel 31.

The attaching portion 13 on the first axial side of the gasket 1 includes an annular inner protrusion (the first ring) 63, an annular groove 65, and an annular outer protrusion (the second ring) 67, which are mounted on the attached portion 23 of the first fluid device 3. The second fluid channel 61 is surrounded by the inner protrusion 63, which is surrounded by the groove 65, which is surrounded by the outer protrusion 67. The inner protrusion 63, the groove 65, and the outer protrusion 67 extend in an axial direction of the gasket 1 (a horizontal direction in FIG. 1). The inner protrusion 63, the groove 65, and the outer protrusion 67 are coaxial with each other and the second fluid channel 61.

The inner protrusion 63 protrudes from the axial center 69 of the gasket 1 toward the first axial direction (leftward in FIG. 2) and extends around the second fluid channel 61 in a circumferential direction of the attaching portion 13. The inner protrusion 63 has a shape that fits the inner concave 35 of the first fluid device 3.

The groove 65 is located between the inner protrusion 63 and the outer protrusion 67. The groove 65 is defined by the inner protrusion 63, the outer protrusion 67, and the axial center 69 of the gasket 1. The groove 65 is open toward the first axial direction of the gasket 1 (leftward in FIG. 2) and extends around the inner protrusion 63 in a circumferential direction of the attaching portion 13. The opening 71 of the groove 65 is located at the same axial position as the tip end 73 of the inner protrusion 63 and the tip end 75 of the outer protrusion 67. The groove 65 has a shape that fits the convex 37 of the first fluid device 3. When the attaching portion 13 is mounted on the attached portion 23, the groove 65 engages with the convex 37 and the inner periphery of the groove 65 is pressed against the convex 37.

The outer protrusion 67 protrudes from the axial center 69 of the gasket 1 toward the first axial direction (leftward in FIG. 2) and extends around the groove 65 in a circumferential direction of the attaching portion 13. The outer protrusion 67 has a shape that fits the outer concave 39 of the first fluid device 3.

Figure 4:
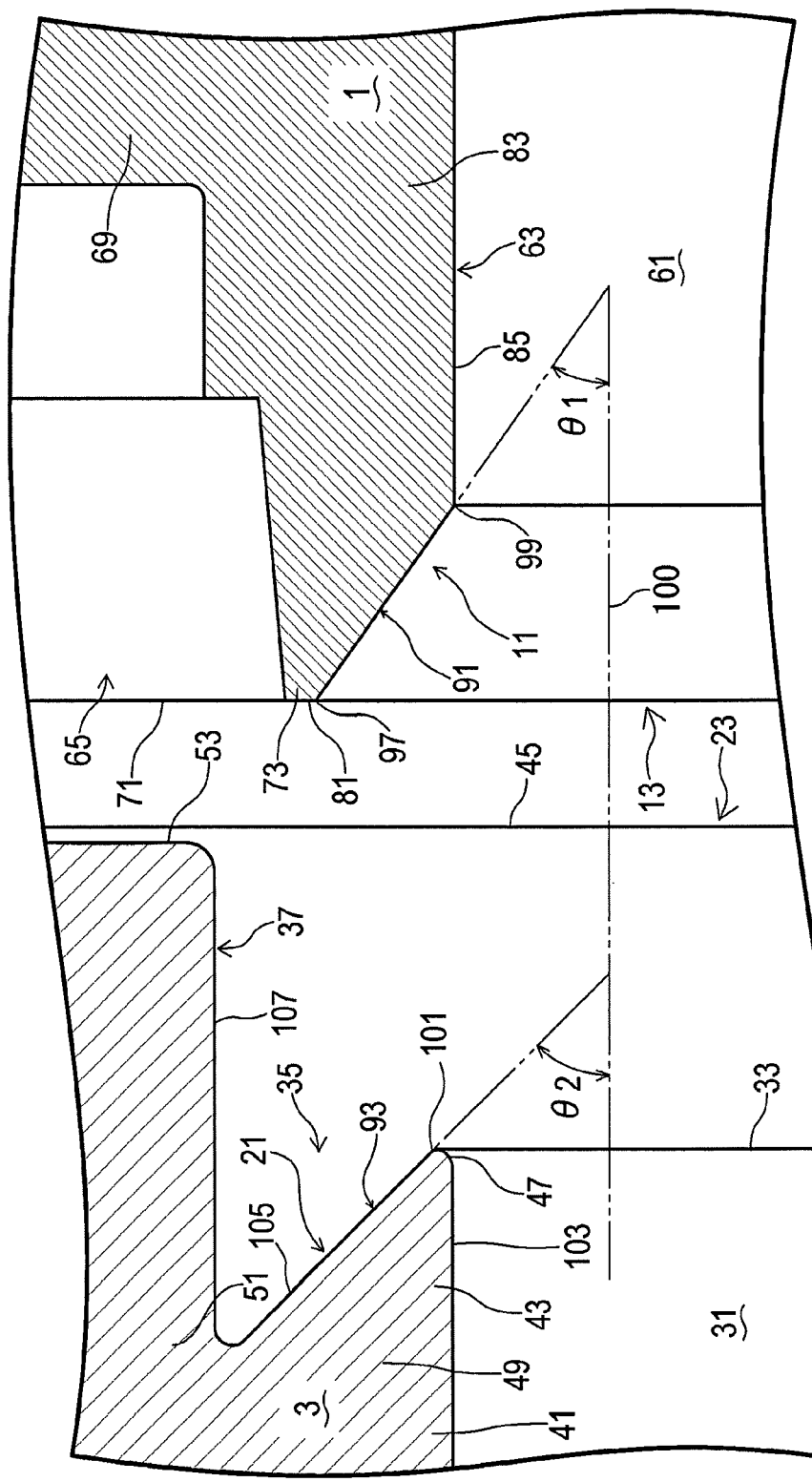
FIG. 4 is a partially enlarged view of FIG. 3.

The inner protrusion 63 has a portion near the tip end 73, i.e. a left portion in FIG. 4. The portion tapers toward the tip end face 81, i.e. the left end face in FIG. 4. The portion includes an inner periphery with the annular first slope 11 and an outer periphery facing the groove 65. The first slope 11 has a shape inclined with respect to the axis 15 of the gasket 1 so that the first slope 11 can contact and press the whole periphery of the annular second slope 21 on the attached portion 23. Note that the axis of the attached portion 23 and the axis 15 of (the attaching portion 13 of) the gasket 1 are colinear with each other. As shown in FIG. 4, the first slope 11 differs in gradient from the second slope 21. The first slope 11 contacts the second slope 21 with the gradient that varies depending on the gradient of the second slope 21 to seal the gap between the slopes 11 and 21.

Figure 5:
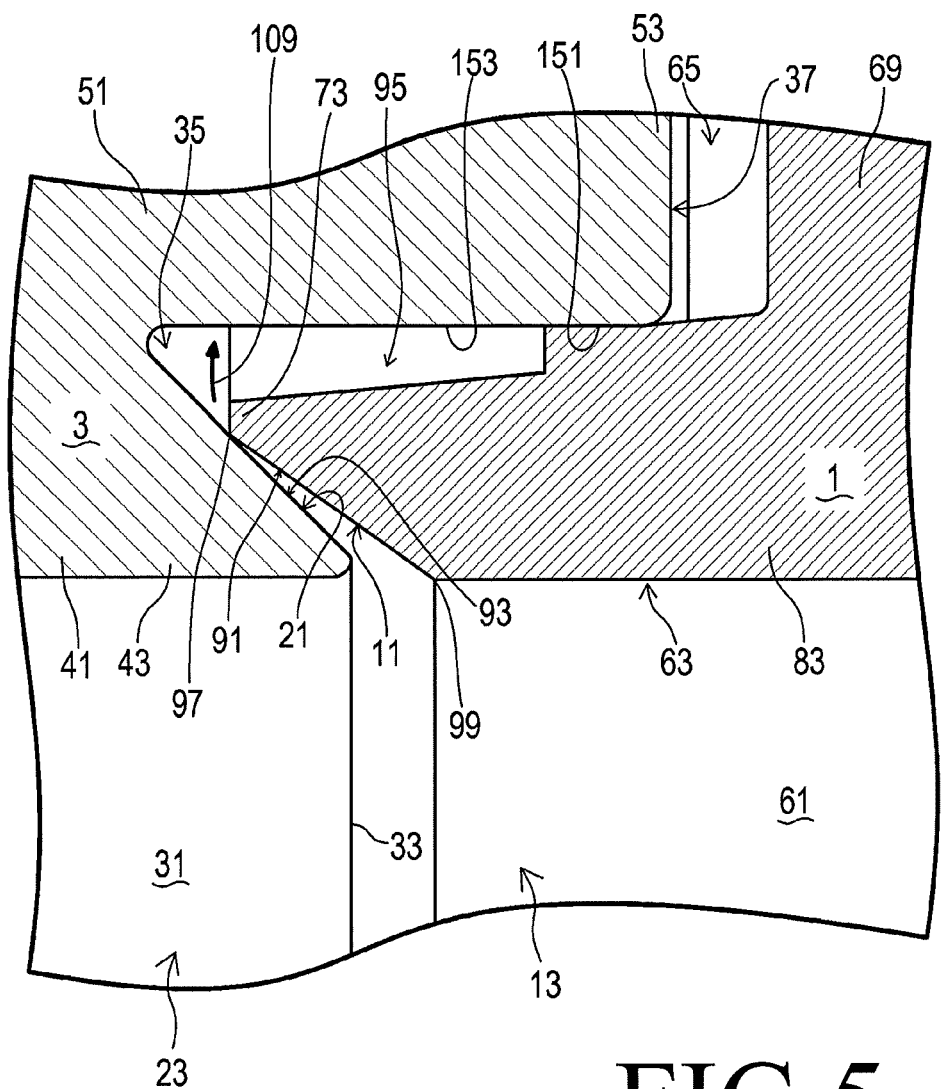
FIG. 5 shows the gasket of FIG. 3 at the moment when it is brought into contact with the fluid device of FIG. 3.

Since the portion of the inner protrusion 63 near the tip end 73 has flexibility, the first slope 11 is deformable to rotate around a portion near the base end 83 of the inner protrusion 63 and move the tip end 73 radially outward from an initial position shown in FIGS. 4 and 5. The first slope 11 then increase its average diameter, while it keeps itself radially separate from the convex 37 of the attached portion 23 of the first fluid device 3.

As shown in FIG. 5, an annular space 95 is present at a radial outside of the first slope 11 and allows the first slope 11 to move radially outward. The annular space 95 encloses the portion of the inner protrusion 63 near the tip end 73 to isolate the portion from the convex 37.

Figure 6:
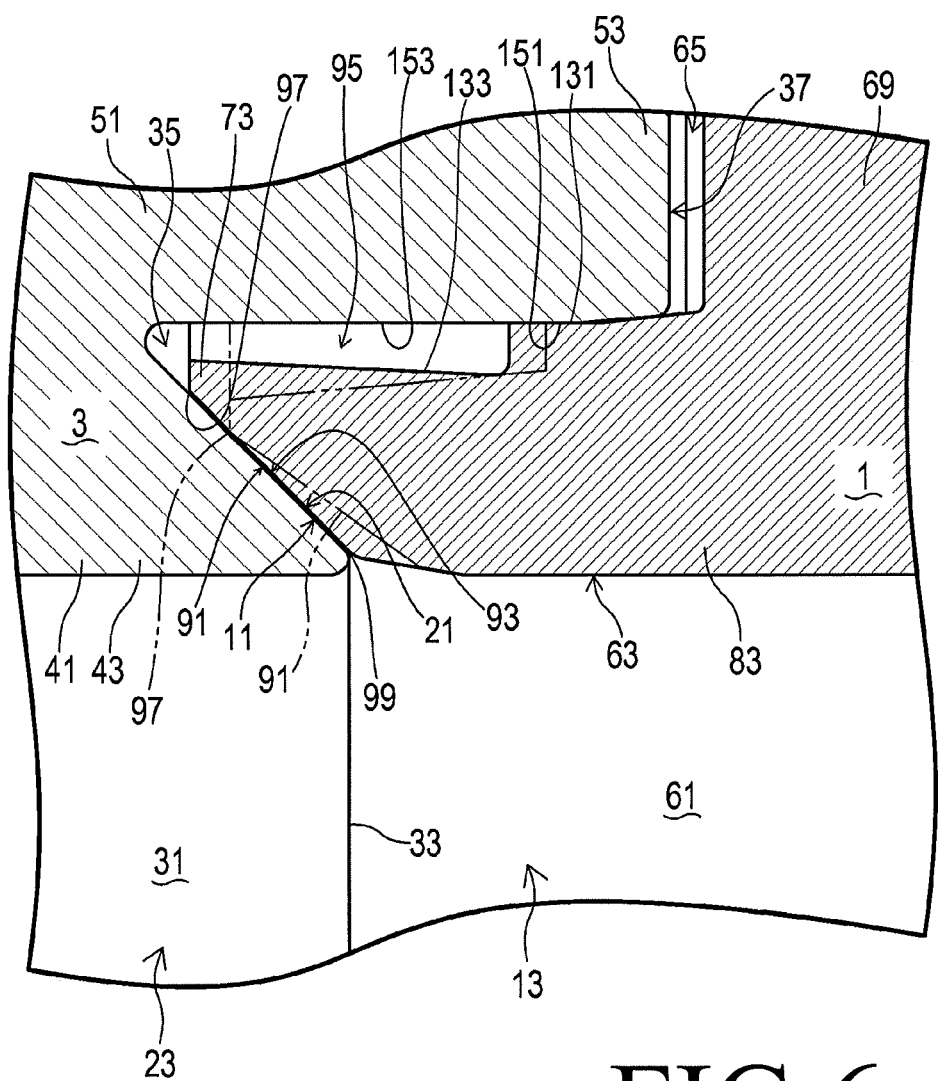
FIG. 6 shows the gasket of FIG. 3 after it completely contacts the fluid device of FIG. 3.

The annular space 95 only has to be present during the transient state of the gasket 1 shown in FIG. 5 when the gasket 1 is being mounted onto the first fluid device 3. When the gasket 1 is completely mounted on the first fluid device 3 as shown in FIG. 6, the portion of the inner protrusion 63 near the tip end 73 may contact the convex 37 to make the annular space 95 disappear.

The first slope 11 has a first tapered face 91. The first tapered face 91 has an annular shape that extends throughout the whole circumference of the inner periphery of the inner protrusion 63. The first tapered face 91 has an outer end 97 near the tip (left) end 73 and an inner end 99 near the base (right) end 83. As shown in FIG. 5, the outer end 97 is continuously connected to the tip end face 81 of the inner protrusion 63, and the inner end 99 is continuously connected to the inner circumferential surface 85 of the inner protrusion 63. The outer end 97 is located radially outside of the inner end 99. The first tapered face 91 is inclined so that its parts at larger distances from the inner end 99 have larger diameters. In other words, parts of the first slope 11 nearer the tip (left) end 73 of the inner protrusion 63 have larger inner diameters.

The axis of the attaching portion 13, which corresponds to the axis 15 of the gasket 1, serves as a reference for the gradient of the first slope 11, i.e. the inclined angle of the first tapered face 91. As shown in FIG. 4, within a cross section of the attaching portion 13 including its axis, the first tapered face 91 is at an inclined angle θ1 to a virtual line 100 parallel to the axis (of the inner protrusion 63). The inclined angle θ1 is constant throughout the whole circumference of the inner protrusion 63.

Figure 2:
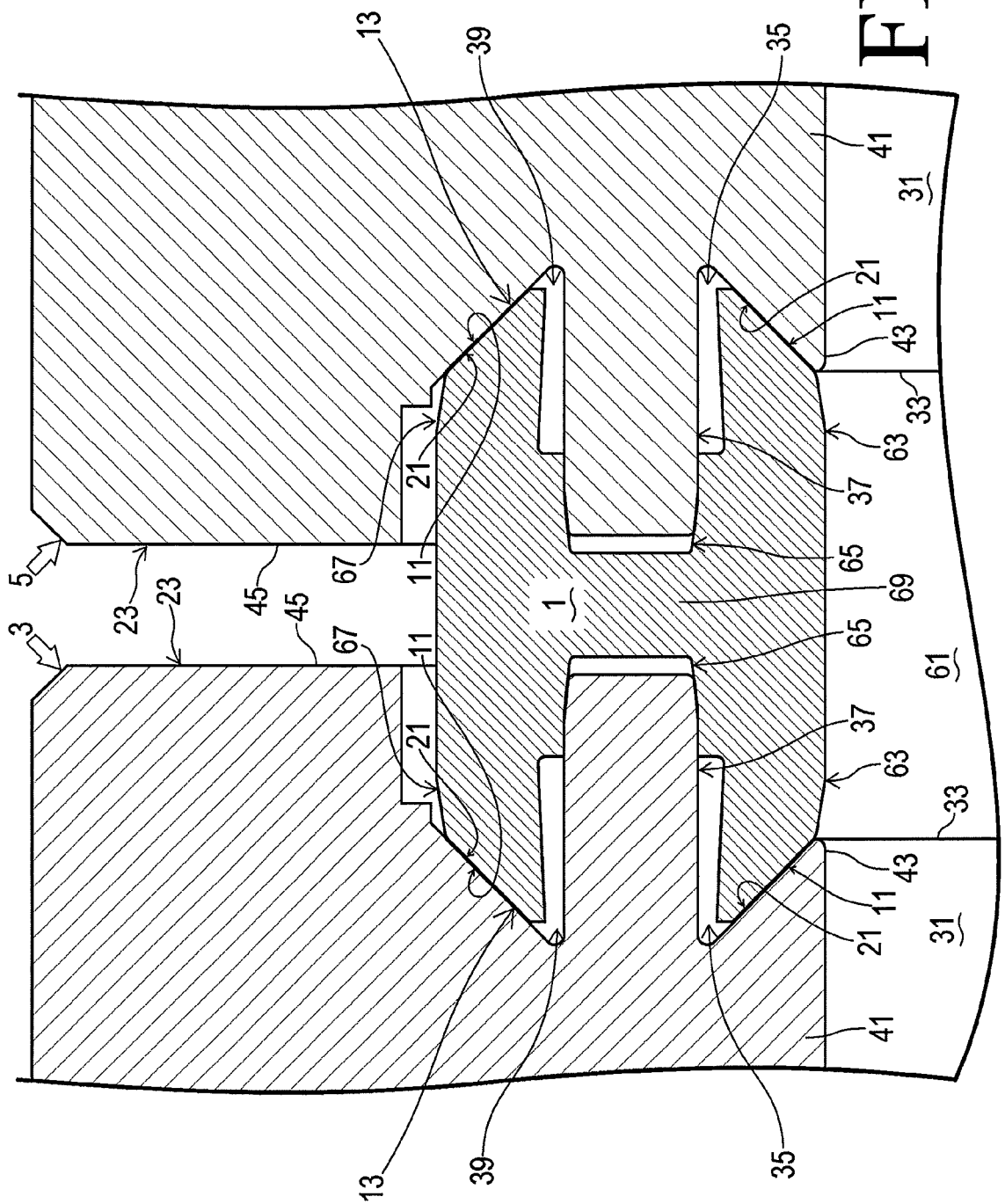
FIG. 2 is a partially enlarged cross-section view of the gasket-mounting structure of FIG. 1.

The second slope 21 is located at the outer periphery of the protrusion 43. As shown in FIG. 2, the second slope 21 faces the first slope 11 and allows a second tapered face 93 to contact and press the first tapered face 91 of the first slope 11. The second tapered face 93 has an annular shape that extends throughout the whole circumference of the outer periphery of the protrusion 43. The second tapered face 93 has an inner end 101 near the tip (right) end 47 of the protrusion 43 and an outer end 105 near the base (left) end 49 of it. The inner end 101 is continuously connected to the inner circumferential surface 103 of the protrusion 43. The outer end 105 is continuously connected to the outer circumferential surface 107 of the convex 37. The second tapered face 93 is inclined so that the inner end 101 is located radially inside of the outer end 105; parts of the second tapered face 93 at larger distances from the outer end 105 have smaller diameters. In the other words, due to the shape of the second tapered face 93, parts of the protrusion 43 nearer the tip end 47 of it have smaller outer diameters.

The axis of the attached portion 23, esp. the axis of the protrusion 43, serves as a reference for the gradient of the second slope 21, i.e. the inclined angle of the second tapered face 93. As shown in FIG. 4, the axis of the attached portion 23 is colinear with the axis of the attaching portion 13. Within a cross section of the attached portion 23 including its axis, the second tapered face 93 is at an inclined angle θ2 to the virtual line 100 parallel to the axis (of the protrusion 43). The inclined angle θ2 is constant throughout the whole circumference of the protrusion 43. The inclined angle θ2 of the second tapered face 93 differs from the inclined angle θ1 of the first tapered face 91. To be exact, the inclined angle θ2 of the second tapered face 93 is larger than the inclined angle θ1 of the first tapered face 91. The gradient of the second slope 21 is larger than that of the first slope 11.

The inner protrusion 63 and the outer protrusion 67 are symmetric with respect to the groove 65. The outer protrusion 67 is symmetric with respect to the second virtual line 19 (cf. FIG. 3). In the figures, components of the outer protrusion 67 are marked by the same reference numbers as symmetric components of the inner protrusion 63. Description on the components of the outer protrusion 67 can be found in description on the symmetric components of the inner protrusion 63.

When the gasket 1 is being mounted on the first fluid device 3, i.e. it is being changed from the position separated from the first fluid device 3 (cf. FIGS. 3 and 4) to the position mounted on it (cf. FIGS. 2 and 6), the attaching portion 13 on the first axial (left) side of the gasket 1 approaches the attached portion 23 of the first fluid device 3. The inner protrusion 63 of the attaching portion 13 contacts the inner concave 35 of the attached portion 23. The groove 65 of the attaching portion 13 contacts the convex 37 of the attached portion 23. The outer protrusion 67 of the attaching portion 13 contacts the outer concave 39 of the attached portion 23. In a similar manner, the gasket 1 also contacts the second fluid device 5.

Next, a coupling means not shown in the figures couples the first fluid device 3 with the second fluid device 5. The fluid devices 3 and 5 are tightly pulled toward each other and squeezed. As shown in FIG. 5, an external force exerted on the gasket 1 makes the outer end 97 of the first tapered face 91 of the first slope 11 contact the second tapered face 93 of the second slope 21.

The coupling means includes, but is not limited to, a hole, a nut, and a bolt. The hole is opened at one of the first fluid device 3 and the second fluid device 5. The nut is attached to the other of the fluid devices 3 and 5. The bolt passes through the hole and is screwed into the nut.

Continuing to squeeze the fluid devices 3 and 5, the coupling means displaces the first slope 11 so that the outer end 97 of the first tapered face 91 moves radially outward, i.e. to the direction of an arrow 109 in FIG. 5. Thus, the first slope 11 moves toward the second slope 21, and the inner end 99 of the first tapered face 91 approaches the second tapered face 93.

An external force further exerted on the gasket 1 makes, in addition to the outer end 97 of the first tapered face 91 of the first slope 11, a portion of the first tapered face 91 near the inner end 99 contact the second tapered face 93 of the second slope 21. Thus, the entirety of the first tapered face 91 contacts the second tapered face 93. The inner protrusion 63 of the attaching portion 13 is engaged with the inner concave 35 of the attached portion 23. The groove 65 of the attaching portion 13 is engaged with the convex 37 of the attached portion 23. The outer protrusion 67 of the attaching portion 13 is engaged with the outer concave 39 of the attached portion 23. As a result, the attaching portion 13 is mounted on the attached portion 23.

When the gasket 1 is completely mounted on the fluid devices 3 and 5, the first slope 11 and the second slope 21 form a first sealing area in which a sealing force acts in an axial direction, and the convex 37 and the groove 65 form a second sealing area in which a sealing force acts in a radial direction. A larger area of (the first tapered face 91 of) the first slope 11 in contact with (the second tapered face 93 of) the second slope 21 can achieve higher sealing performance of the first sealing area. This reduces pressure required for forming the first sealing area and thus facilitates sealing the gap between the first slope 11 and the second slope 21.

While pressing the second slope 21, the first slope 11 moves along the second slope 21. This makes the first slope tightly attached to the second slope 21 and improves the stability of the sealing performance between the slopes 11 and 21. In addition, the second slope 21 is hardly displaced radially inward, i.e. toward the first fluid channel 31. This prevents the second slope 21 from moving radially inward and interrupting the flow of fluid in the first fluid channel 31.

Figure 7:
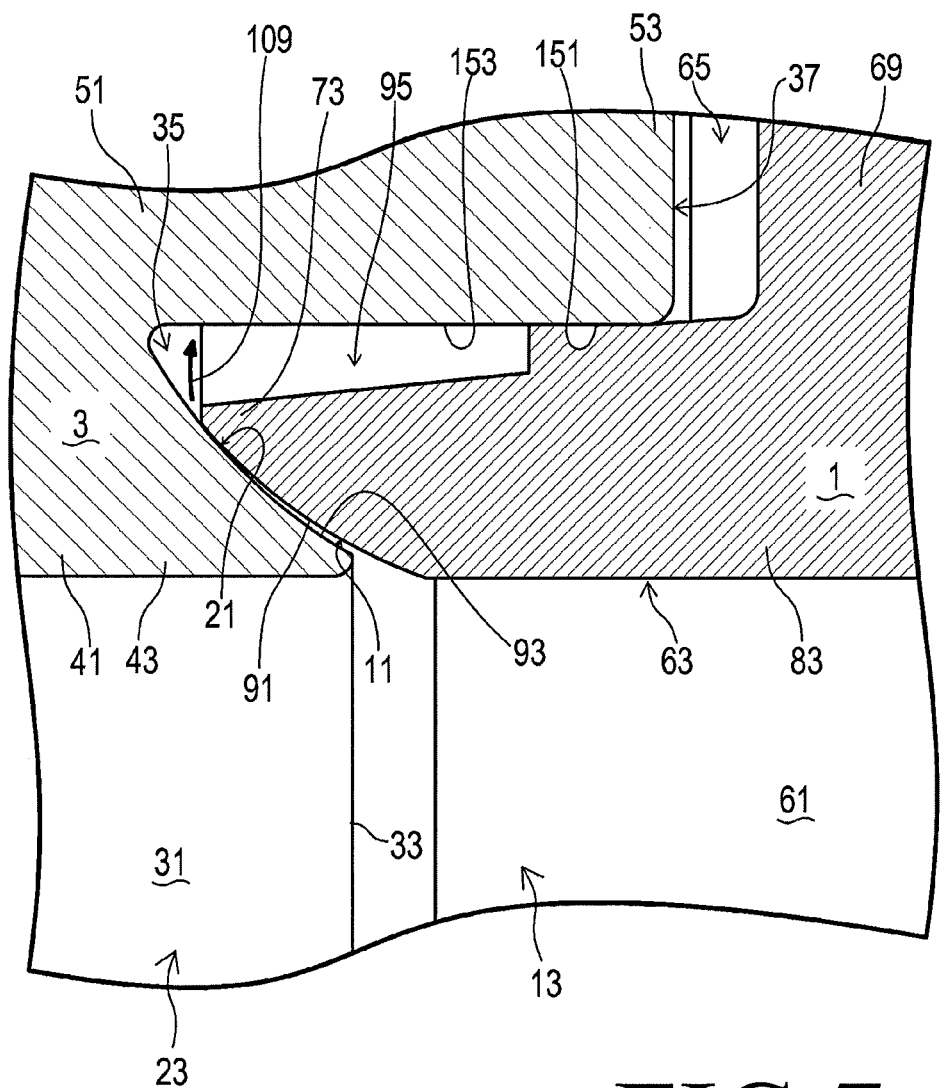
FIG. 7 shows a gasket-mounting structure of another embodiment of the invention at the moment when a gasket is brought into contact with a fluid device.
Figure 8:
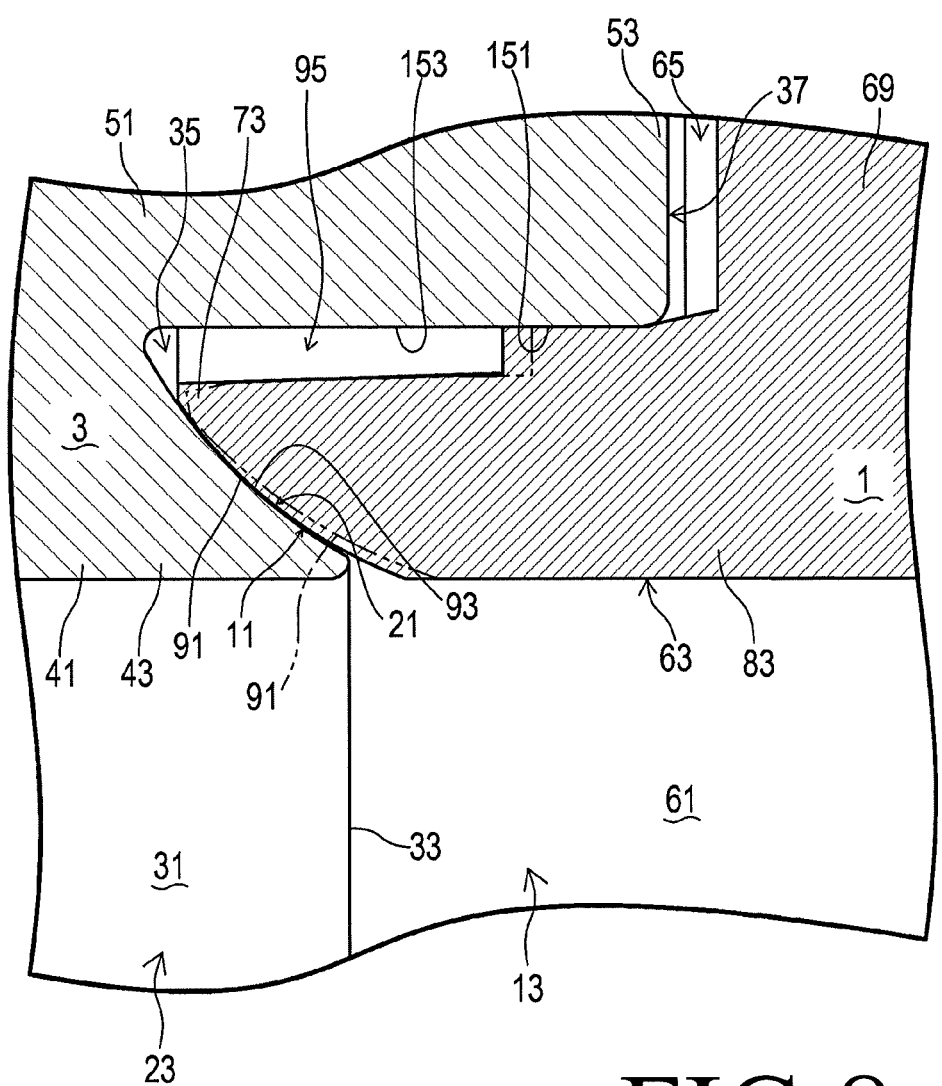
FIG. 8 shows the gasket-mounting structure of FIG. 7 after the gasket completely contacts the fluid device.

The gradients of the slopes 11 and 21 are not limited to the above-mentioned inclined angles θ1 and θ2. For example, the tapered face 91 and 93 may be annular and curved faces as shown in FIGS. 7 and 8. In this case, curvatures of the tapered faces 91 and 93 may determine the gradients of the slopes 11 and 21. More concretely, the first tapered face 91 may be a curved face convex to the second tapered face 93, and the second tapered face 93 may be a concave face that fits the first tapered face 91. While pressing the second tapered face 93, the first tapered face 91 moves along the second tapered face 93 radially outward, i.e. toward the direction of an arrow 109 shown in FIG. 7.

As shown in FIG. 6, the convex 37 (the second sleeve of the first fluid device 3) is placed between the inner protrusion 63 and the outer protrusion 67 (the first and second rings of the gasket 1), i.e. within the groove 65. In addition, the convex 37 is separated radially from the first axial end (the tip end 73) of the inner protrusion 63 and pressed by the second axial end (the base end 83) of the inner protrusion 63.

To be exact, the convex 37 has a tip end portion 151 near the tip end 53 and a base end portion 153 near the base end 51. Between the inner protrusion 63 and the outer protrusion 65, the tip end portion 151 contacts a second axial (right) end portion 131 of the inner protrusion 63, and the base end portion 153 faces a first axial (left) end portion 133 of the inner protrusion 63 across the annular space 95. The annular space 95 keeps the first axial end portion 133 of the inner protrusion 63 separate from the base end portion 153 of the convex 37 even after the gasket 1 is completely mounted on the first fluid device 3, i.e. after the first slope is completely displaced radically outward.

The outer periphery of the inner protrusion 63 has a stepwise shape, and thus, the first axial end portion 133 of the inner protrusion 63 has a larger outer diameter than the second axial end portion 131 of it. On the other hand, the convex has a constant inner diameter. Accordingly, when the tip end portion 151 of the convex 37 contacts the second end portion 131 of the inner protrusion 63, the base end portion 153 of the convex 37 is separated from the first axial end portion 133 of the inner protrusion 63 throughout its whole circumference.

This structure enables sealing the gap between the tip end portion 151 of the convex 37 and the second axial end portion 131 of the inner protrusion 63. Thus, the convex 37 and the inner protrusion 63 forms the second sealing area in the groove 65. Double action of the first and second sealing areas improves sealing performance and reliability.

Since the base end portion 153 of the convex 37 does not press the first axial end portion 133 of the inner protrusion 63, pressure against the inner protrusion 63 is reduced when the convex is press-inserted into the groove 65. This facilitates press-inserting the convex 37 into the groove 65 and forming the double sealing areas.

As described above, the first slope 11 and the second slope 21 may be straight slopes or curved slopes.

The above-described explanation teaches that the invention can obviously have variations and modifications. Accordingly, it should be understood that the invention can have embodiments other than those in the description within the scope of the claims attached to the description.

Supplement

Based on the above-described embodiments, the invention may be further characterized as follows:

In the structure according to the invention, the first slope may have a tapered shape, and the second slope may have a tapered shape. An axis of the gasket may serve as a reference for the gradient of the first slope. An axis of a portion of the fluid device, on which the gasket is mounted, may serve as a reference for the gradient of the second slope.

In the structure according to the invention, the first slope may have an annular and curved shape, and the second slope may have an annular and curved shape. The curvature of the first slope may determine the gradient of the first slope, and the curvature of the second slope may determine the gradient of the second slope.

In the structure according to the invention, the gasket may include a first ring with the first slope and a second ring radially outside the first ring. The fluid device may include a first sleeve with the second slope and a second sleeve radially outside the first sleeve. The second sleeve may be placed between the first ring and the second ring, separated radially from the first axial end of the first ring, and pressed by a second axial end of the first ring.

This structure enables sealing the gap between the tip end portion of the second sleeve and the first ring. Thus, in addition to a sealing area formed by the first and second slopes, another sealing area is formed by the second sleeve and the first ring. Double action of these sealing areas improves sealing performance and reliability.

Since the base end portion of the second sleeve does not press the first ring, pressure against the first ring is reduced when the second sleeve is inserted between the first and second rings. This facilitates inserting the second sleeve between the first and second rings and forming the double sealing areas.

What is claimed is:

1. A combination of a gasket and a fluid device allowing the gasket to be mounted thereon, wherein
   the gasket comprises a first ring including:
   a first axial end having a first slope at an inner periphery;
   a second axial end boated on an opposite side of the first ring from the first axial end; and a stepwise shape located between outer peripheries of the first axial end and the second axial end to provide the second axial end with an outer diameter larger than an outer diameter of the first axial end;

the fluid device includes:

a second slope that, when separated from the first slope, has a gradient different from a gradient of the first slope, and that contacts and presses the first slope such that the gradient of the first slope varies depending on the gradient of the second slope to seal a gap between the first slope and the second slope, and such that the first axial end of the first ring is deformed radially outward to increase an average diameter of the first axial end; and a convex formed as a sleeve surrounding the second slope, wherein when the first slope contacts and presses the second slope, an inner periphery of a tip end of the convex contacts and presses an outer periphery of the second axial end of the first ring, and due to the stepwise shape of the first ring, the inner periphery of a base end of the convex is radially separated from an outer periphery of the first axial end of the first ring.

2. The combination structure according to claim 1 wherein:

the first slope has a tapered shape;

the second slope has a tapered shape;

an axis of the gasket serves as a reference for the gradient of the first slope; and an axis of a portion of the fluid device, on which the gasket is mounted, serves as a reference for the gradient of the second slope.

3. The combination structure according to claim 1 wherein:

the first slope has an annular and curved shape;

the second slope has an annular and curved shape;

a curvature of the first slope determines the gradient of the first slope; and a curvature of the second slope determines the gradient of the second slope.

4. The combination structure according to claim 1 wherein:

the gasket includes a second ring radially outside the first ring;

the fluid device includes a sleeve-shaped protrusion with the second slope; and when the first slope contacts and presses the second slope, the convex is placed between the first ring and the second ring, separated radially from the first axial end of the first ring, and pressed by the second axial end of the first ring.

* * * * *

UNITED STATES PATENT AND TRADEMARK OFFICE
CERTIFICATE OF CORRECTION

PATENT NO. : 11,306,819 B2
APPLICATION NO. : 16/424590
DATED : April 19, 2022
INVENTOR(S) : Nakano et al.

It is certified that error appears in the above-identified patent and that said Letters Patent is hereby corrected as shown below:

In the Claims

In Column 8, Claim 1, Line 66, delete "boated," and insert -- located, --, therefore.

Signed and Sealed this
Fifth Day of July, 2022

Katherine Kelly Vidal
*Director of the United States Patent and Trademark Office*